United States Patent [19]
Oudet et al.

[11] Patent Number: 5,559,378
[45] Date of Patent: Sep. 24, 1996

[54] THREE-POLE ELECTROMAGNETIC ACTUATOR FOR PNEUMATIC DISTRIBUTING DEVICES

[75] Inventors: Claude Oudet, Besancon; Pierre Gandel, Montaucon, both of France

[73] Assignee: Moving Magnet Technologies, S.A., Besancon, France

[21] Appl. No.: 211,426

[22] PCT Filed: Oct. 9, 1992

[86] PCT No.: PCT/FR92/00940

§ 371 Date: Jun. 30, 1994

§ 102(e) Date: Jun. 30, 1994

[87] PCT Pub. No.: WO93/07673

PCT Pub. Date: Apr. 15, 1993

[30] Foreign Application Priority Data

Oct. 11, 1991 [FR] France .................. 91 12587

[51] Int. Cl.⁶ .................................. H02K 33/12
[52] U.S. Cl. .................. 310/17; 310/15; 360/104
[58] Field of Search .................. 310/12, 13, 14, 310/15, 17, 30; 335/262; 360/105, 106, 104

[56] References Cited

U.S. PATENT DOCUMENTS 5,013,223  5/1991  Takahashi et al. .................. 417/413
5,136,194  8/1992  Oudet et al. .................. 310/15

FOREIGN PATENT DOCUMENTS 0134827   3/1985   European Pat. Off. .
2031901  11/1970   France .
1157691  11/1963   Germany .
3246064   6/1984   Germany .
 624522   7/1981   Switzerland .
90/16109 12/1990   WIPO .

*Primary Examiner*—Thomas M. Dougherty
*Assistant Examiner*—Judson H. Jones
*Attorney, Agent, or Firm*—Oblon, Spivak, McClelland, Maier & Neustadt, P.C.

[57] ABSTRACT

The present invention relates to an electromagnetic actuator comprised of a stator structure made of soft magnetic material which is unsaturated in rated operating conditions, comprising two stator parts (1 and 2) at least one of the stator structures (1) presenting a central pole (5) having a length $Y_C$ and two side poles (6,7) having a length $Y_L$ said stator parts (1,2) delimiting an air gap E inside which there is arranged a rotor movable member comprising two pairs of poles having a length $Y_R$ comprised of thin permanent magnets (10 and 11) which are transversely magnetized, characterized in that the length $Y_C$ of the central stator pole (5) is longer or equal to the stroke Y of the rotor movable member increased by a length substantially equal to the length E of the air gap, the length $Y_L$ of the side poles (6,7) being determined by the volume occupied by the electric energization coil as a function of the force by the electric power applied and the thickness Z of said coil, this thickness Z being measured along an axis perpendicular to the plane of the thin magnets (10,11), the length $Y_L$ of the side poles (6,7) being longer than the length $Y_C$ of the central pole (5).

11 Claims, 5 Drawing Sheets

FIG_1
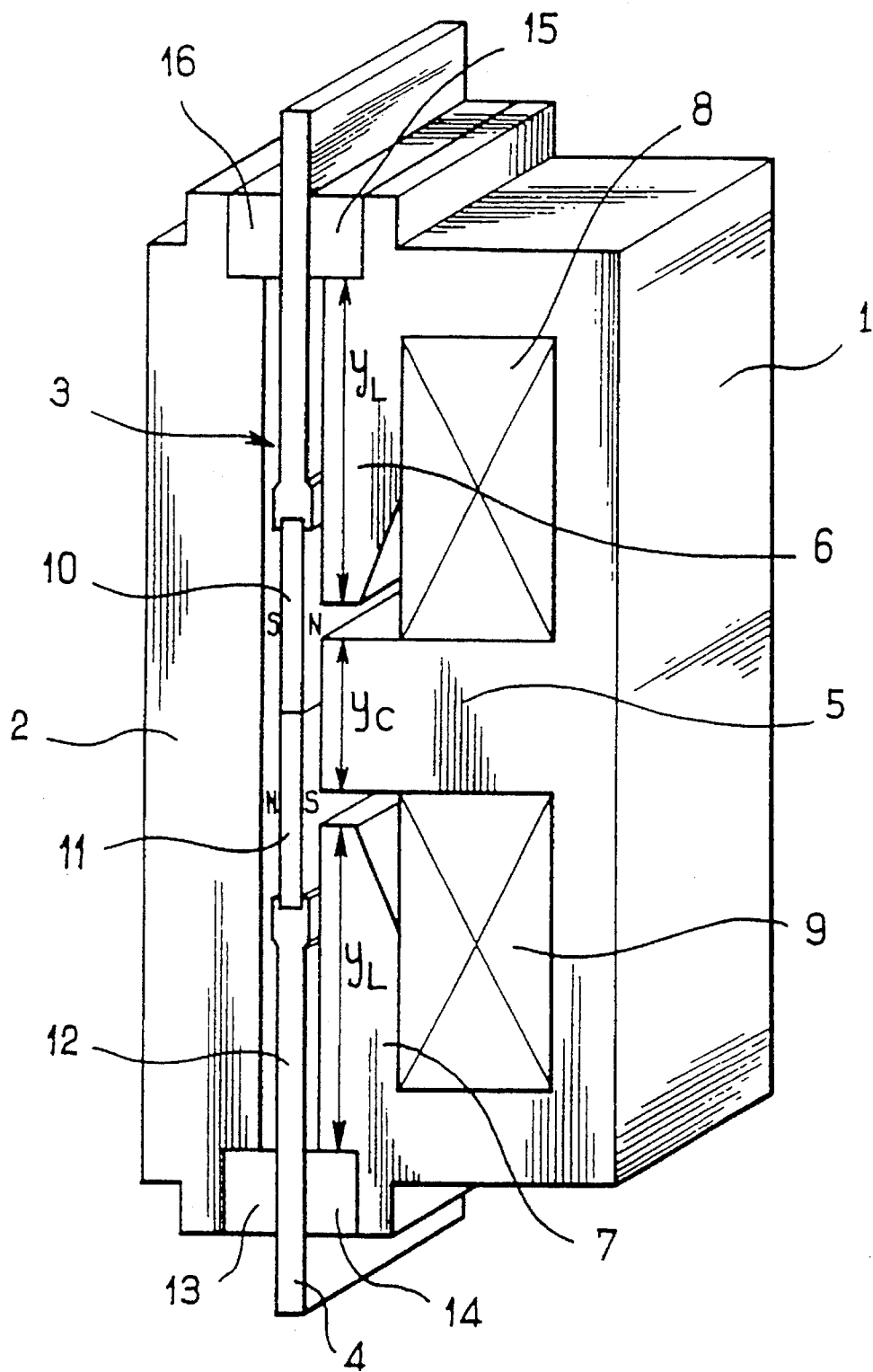

FIG_2
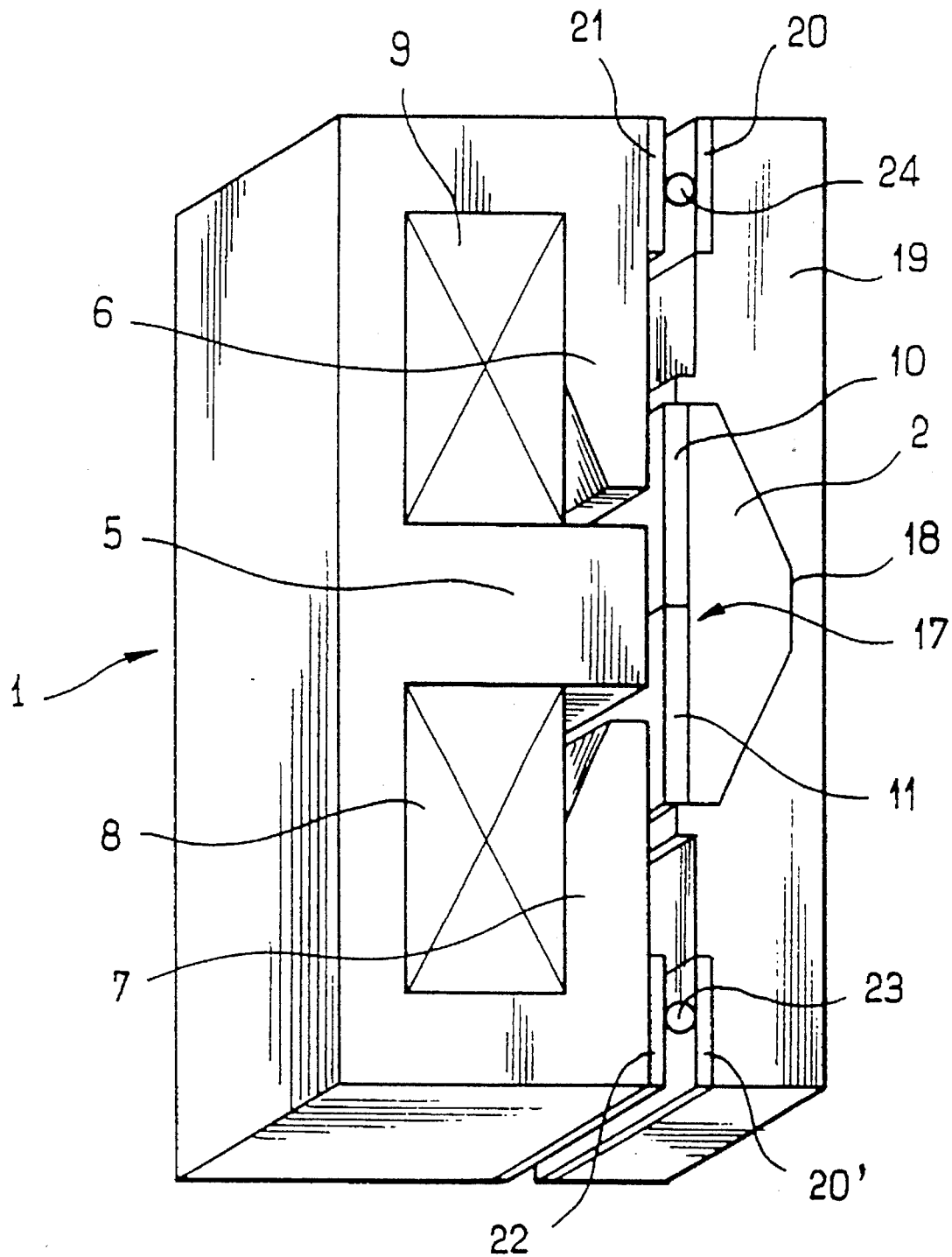

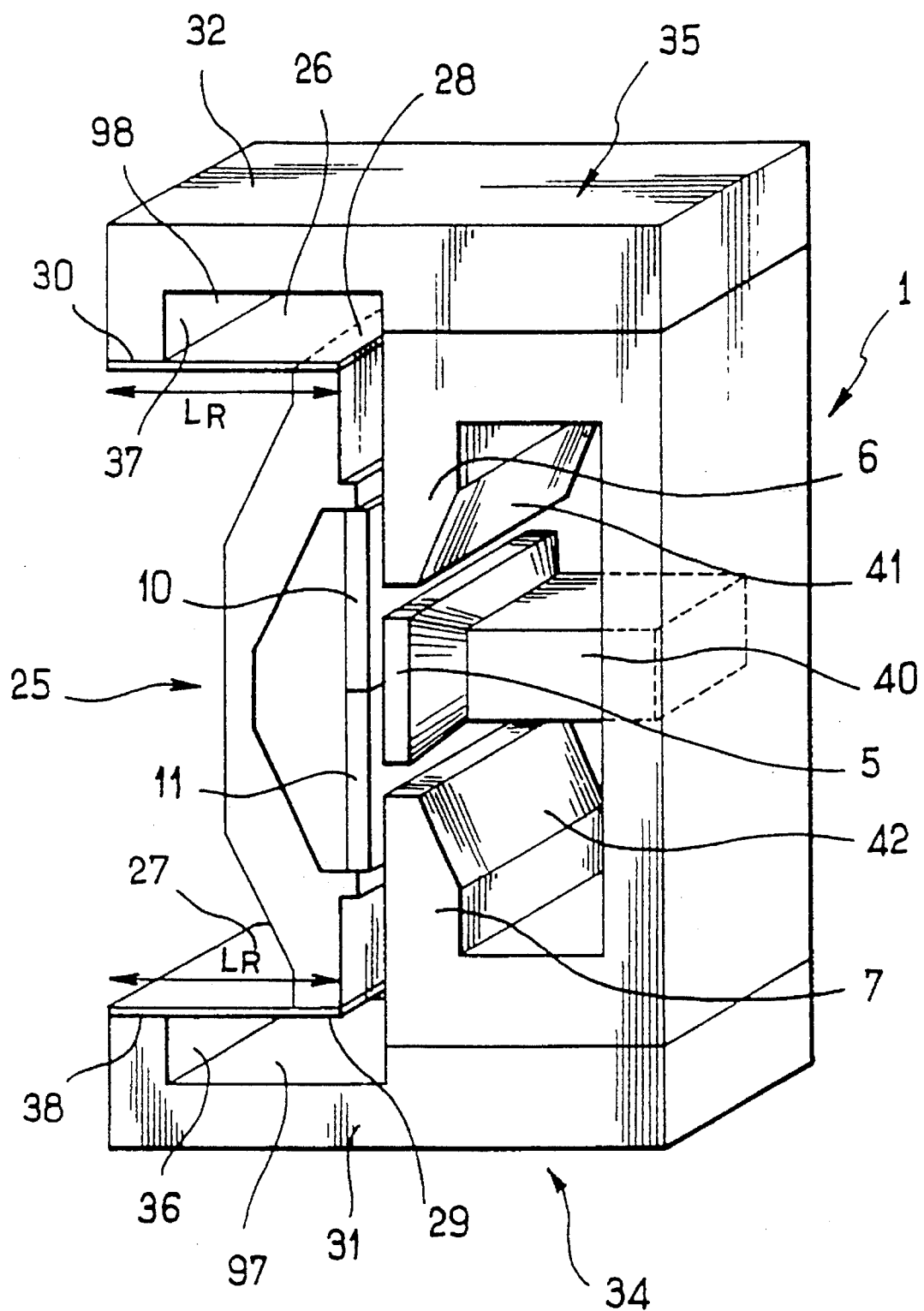
FIG_3

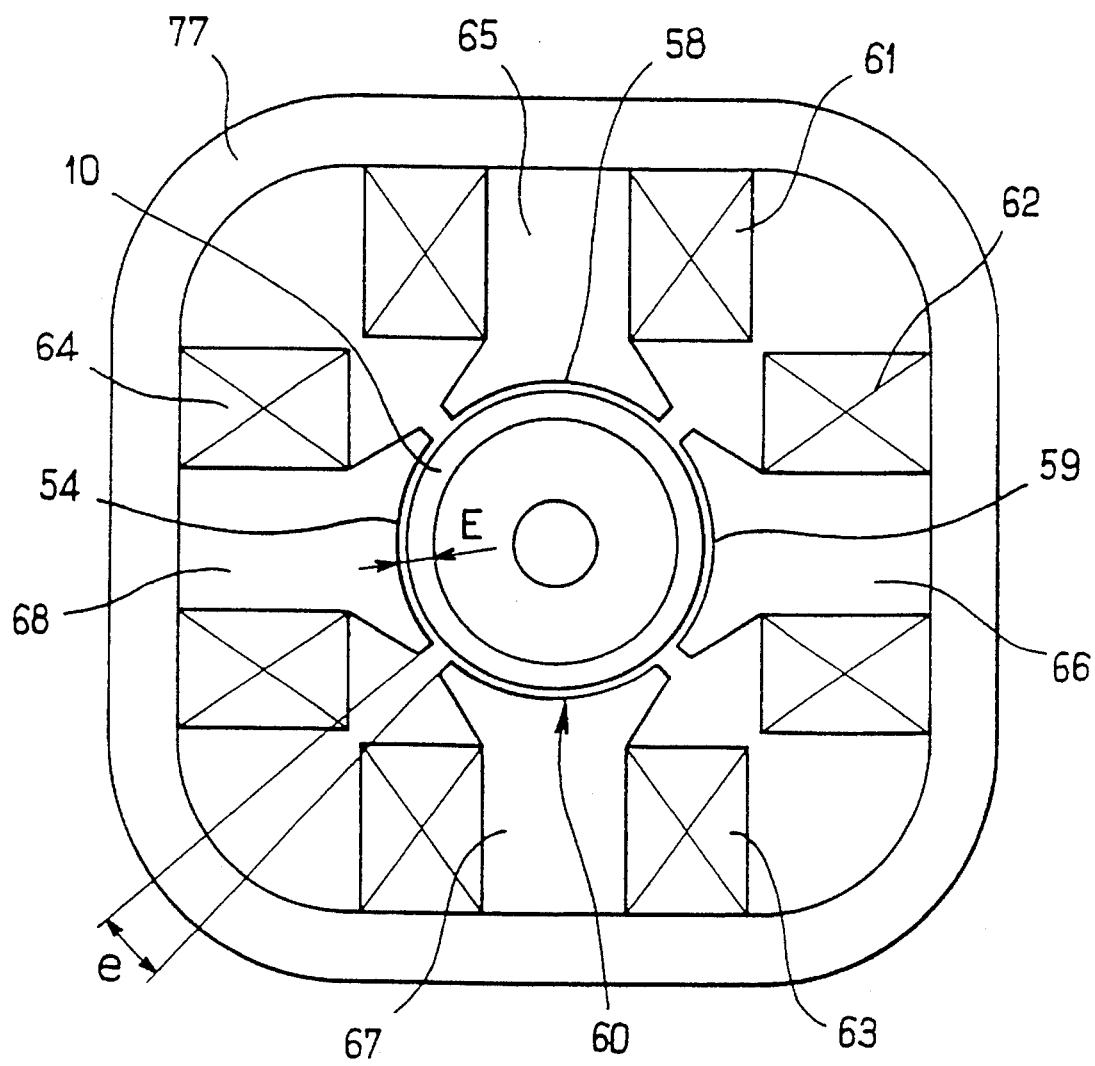
FIG_4

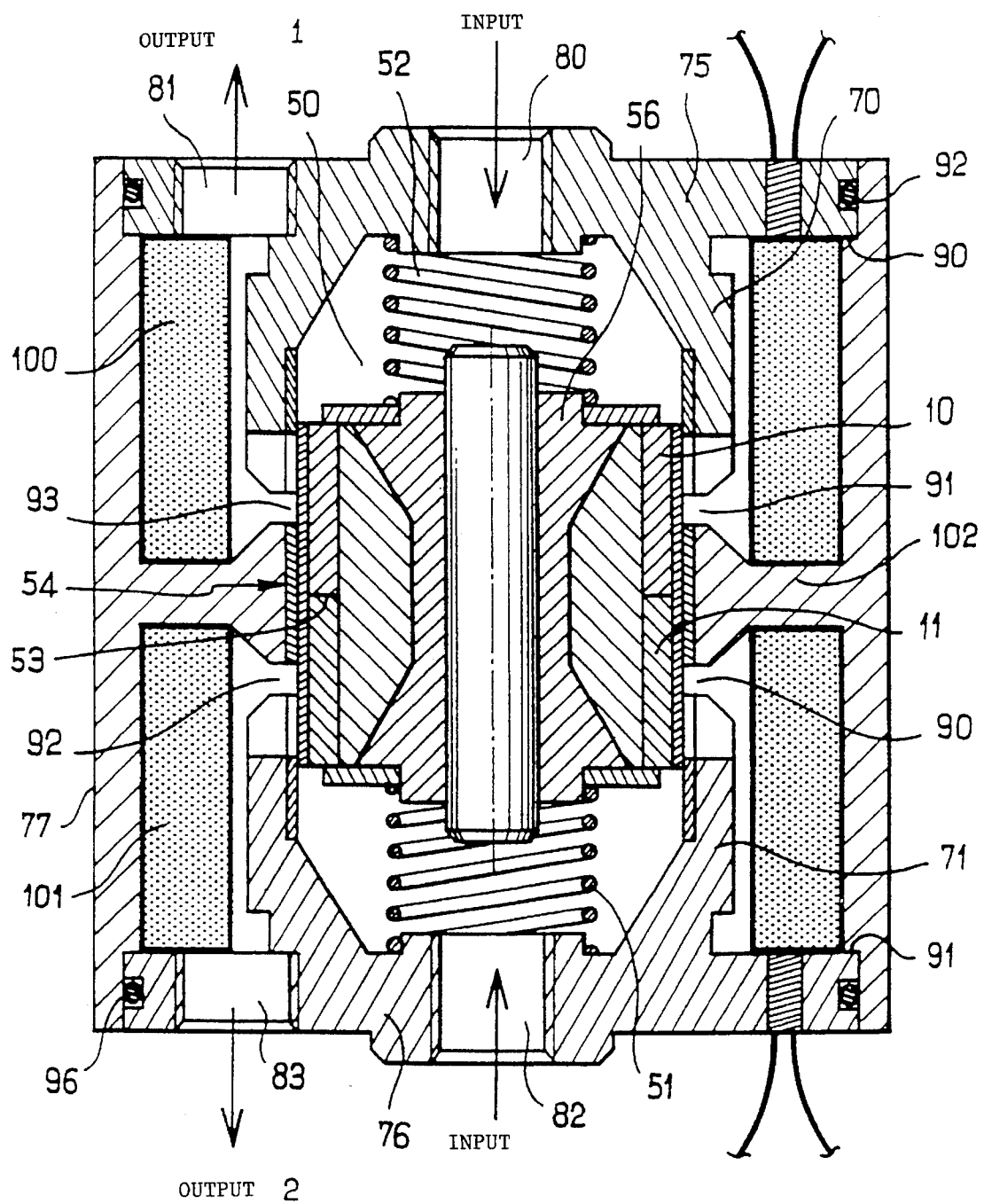
FIG_5

THREE-POLE ELECTROMAGNETIC ACTUATOR FOR PNEUMATIC DISTRIBUTING DEVICES

BACKGROUND OF THE INVENTION

1. Field of the Invention

The present invention concerns an electromagnetic actuator of the type which generates a force resulting from substantially-constant current over the entire functional course of travel and which generates a reduced force in the absence of current, this actuator including a stator structure having two components, of which at least one incorporates three stator poles, and of a device which is movable in translational motion comprising two pairs of poles corresponding to two thin magnets magnetized in opposite directions; it further concerns the manufacture of pneumatic distributing devices utilizing these actuators.

2. Discussion of the Background

The general concept of such actuators, which can be produced incorporating plane or axial symmetry, are known in prior art.

In particular, the Applicant holds French Patent No. 89/08051, which discloses a single-phased electromagnetic actuator taking up little space. The actuators described in this patent are designed, in particular, for control of hard disk reading and writing heads or the actuation of plotting table pens. In these cases, a low electric time constant is sought.

For applications in which a strong force generated by electric power applied to the coil is sought, these three stator-pole actuators known according to prior art exhibit disadvantages. Indeed, when the width of the three poles match the course of travel of the rotor, the space available for housing the copper wire belonging to the electric trip coil may prove to be insufficient.

One may certainly increase the width of the poles beyond the dimension required for the expected course of travel of the rotor. In this case, it is also necessary to increase the width of the stator poles, a step which increases the cost price, since the high-quality magnetic materials used to produce the high-performance thin magnets are expensive.

Prior art further encompasses suggestions for producing multi-stage actuators having 2N+1 stator poles and 2N pairs of rotor poles, or 2N+1 pairs of rotor poles and 2N stator poles. However, in addition to the high cost of these actuators, these devices take up large amounts of space.

SUMMARY OF THE INVENTION

The object of the present invention is to remedy these difficulties by proposing an electromagnetic actuator incorporating three stator poles and two pairs of rotor poles of such a nature as to generate a force by means of significant applied electric power and having optimal space requirements. More especially, the invention concerns an actuator of the linear type or incorporating axial geometry, including a stator structure having two stator elements. One of the stator elements has a central pole whose length $Y_C$ is greater than, or equal to, the course of travel Y of the rotor component, increased by a length substantially equal to the length E of the air gap. The length $Y_L$ of the lateral poles is determined solely by the volume required for housing the electric trip coil, whose characteristics are calculated as a function of the required force generated by applied electric current, on the one hand, and of the thickness Z of this coil, on the other. The length $Y_L$ is greater than the length $Y_C$ of the central stator pole.

Contrary to current teachings in the field, the three-pole actuator according to the invention incorporates one central pole and two lateral poles of different sizes. This embodiment, which the specialist finds surprising, nevertheless makes it possible to maintain satisfactory performance levels, while making possible the housing of a coil incorporating a large volume of copper. It further makes it possible to limit the lateral space requirement, and, accordingly, to allow adaptation of the device to the constraints made obligatory in numerous applications.

The preferred ratio between the thickness of the coil as measured in the plane perpendicular to the thin magnet and the length of $Y_{cu}$ of the coil as measured along the axis of travel of the mobile element is less than, or equal to, 1, and is preferably equal to 1. In other words, the coil is longer than it is high, and preferably has a square cross-section. Indeed, this choice makes it possible to restrict magnetic field leakage across the copper coil.

According to a preferred embodiment making it possible to increase still further the volume of copper without increasing the outer dimensions of the actuator, the central pole is extended by a core whose section is smaller than the section of said central pole. The core section thus formed is determined so as to allow for passage of magnetic flux under rated operating conditions, without saturation of the material which composes it.

The actuator according to the invention may be manufactured using plane or axial symmetry. In the latter case, the stator structure and the rotor are cylindrical. The rotor can travel in translational motion along an axis Y corresponding to the axis of curvature of the cylindrical stator structure and of the rotor.

The ratio $D_b/d_b$ is preferably between 1.2 and 2.1, where:

$D_b$ designates the outer diameter of the coils;

$d_b$ designates the inner diameter of the coils.

This ratio is, preferably, substantially equal to 1.65, and at the very least between 1.4 and 1.9. This ratio allows optimization of the magnetic losses occurring in the stator structure.

The central pole is preferably separated from the lateral poles by a distance e greater than, or equal to 0.5 E, where E signifies the width of the air gap.

According to a preferred embodiment, the second stator component is movable and is attached to the rotor. This embodiment makes it possible to reduce the air gap, and thus, to increase the output of the actuator.

The second stator component preferably includes a yoke made of a soft magnetic material which cannot be saturated under rated operating conditions and having a length at most equal to the length of the rotor poles. The cross-section of this yoke is advantageously trapezoidal.

The invention also relates to a pneumatic valve formed by a cylindrical body incorporating at least one first outlet connecting with a first inlet when the movable device is in a first position, and this connection between said first inlet and said first outlet being broken when said movable device is in a second position.

BRIEF DESCRIPTION OF THE DRAWINGS

Specific embodiments of the present invention will be described hereinafter, with reference to the drawings, in which:

FIG. 1 represents a perspective view of one embodiment of an actuator embodying plane symmetry, in which the second stator part is stationary;

FIG. 2 illustrates an embodiment of an actuator according to the invention, in which the second stator element is movable in conjunction with the permanent magnets;

FIG. 3 illustrates an embodiment of an actuator according to the invention, in which the movable component is suspended on spring-leaves;

FIG. 4 is a transverse cross-section view of an actuator embodying axial symmetry, comprising four coils, each of which encloses one of the cores;

FIG. 5 illustrates a longitudinal cross-section view of a pneumatic valve employing an actuator embodying axial symmetry.

DESCRIPTION OF THE PREFERRED EMBODIMENTS

The actuator shown in FIG. 1 is composed of a stator structure comprising a first stator component 1 and a second stator component 2. These two stator components 1 and 2 delimit an air gap 3, inside which a movable device 4 travels. The first stator component 1 incorporates three stator poles, i.e., a central stator pole 5 and two lateral stator poles 6 and 7. The first stator component 1 further incorporates two cavities 8, 9 having square transverse section, in which a copper-wire coil surrounding the base of the central pole 5 is housed. This coil generates a magnetic field closed on itself across the two rotor poles 10, 11 and the second stator component 2. The two rotor poles 10, 11 are formed by two adjacent thin magnets magnetized transversely in opposite directions. In the example described, the first rotor pole 10 incorporates a north pole extending toward the first stator component 1 and a south pole extending toward the second stator component 2. The second rotor pole 11 incorporates a south stator pole directed toward the first stator component 1 and a north pole extending toward the second stator component 2.

The thin magnets are made of a magnetic material, such as neodymium-iron-boron or samarium-cobalt.

The two rotor poles 10, 11 are mounted in a support 12 made of a non-magnetic material. This support is guided by means of pads 13, 14, 15, 16 arranged at the ends of the stator components 1 and 2.

The width $Y_C$ of the central stator pole 5 corresponds substantially to the course of travel of the movable device 4, increased by a dimension E corresponding to the width of the air gap. The length $Y_L$ of the two lateral poles 6, 7 is determined by the volume of copper required to reach the force generated by the required applied electric power.

In the embodiment shown in FIG. 1, the direction z is perpendicular to the plane of the page, i.e., the direction perpendicular to the axis Y of travel of the movable device contained within the plane of said movable device. The force F equals 2.B.Z.n.i., where:

B is the induction generated by the magnet in the air gap. This value is constant in terms of absolute value in the absence of current;

Z is the thickness of the rotor in direction z;

n is the number of turns of copper wire;

i is the intensity of the current applied to the coil.

If ni is expressed as a function of the current applied $P_e$, the force F is expressed as:

$$F = 2 \times B \times Z \times \sqrt{P_e/R_0}$$

or, for a unitary current $P_e=1$.

$$F1 = \frac{2 \times B \times Z}{\sqrt{R_0}}$$

where $R_0$ is a geometric coefficient linked to dimensions of the coil.

If it is accepted that the central pole 5 of the stator is limited strictly to the width $Y_C$ required to generate a constant force over the necessary course of travel, the coefficient $R_0$ can be expressed as a function of:

$Y_C$, which is the width of the central pole 5 measured along the axis Y;

Z, which is the thickness of the central pole 5 as measured in the direction z;

H, which is the height of the coil along the axis X perpendicular to the plane of the magnets;

$Y_L$, the width of the lateral poles as measured along the axis Y parallel to the axis along which the mobile device travels freely in translational motion;

$Y_{cu}$ is the copper thickness;

η is the space factor of the coil;

ρ is the resistivity of the copper.

Thus:

$$R_0 \simeq \rho \frac{2Y_c + 2Z + \pi Y_{cu}}{Y_{cu} H \eta},$$

or $Z = v \times Y_L$, $$R_0 \simeq \frac{2 \times (1+v) \times Y_c \frac{Y_{cu}+\pi}{H \times \eta}}$$

Given the required parameters ρ, v, $Y_C$, $R_0$ can be reduced, and, accordingly, F1 can be increased by adjusting the parameters $Y_{cu}$ and H. The parameter H, i.e., the height of the coil, is often limited by the maximum acceptable space requirement. To increase the force per watt-root, the actuator according to the invention makes it possible to increase the length of the coil, by virtue of the lateral poles whose dimensions are greater than the dimensions of the central pole.

In the example described, the length $Y_L$ of the lateral poles 6 and 7 is two times greater than the length $Y_C$ of the central pole 5.

The second stator component in the embodiment described in FIG. 1 incorporates a parallelepiped-shaped volume made of a material exhibiting high magnetic permeability and whose dimensions are sufficient to allow the passage of the entirety of the magnetic flux through the magnets 10 and 11.

FIG. 2 is a variant embodiment of an actuator incorporating plane symmetry, in which the second stator part 2 is attached to the adjacent permanent magnets 10 and 11.

The second stator component 2 has a trapezoidal cross-section, the large base 17 of which corresponds to the plane of junction with the magnets 10 and 11, and the small base 18 is determined so as to allow optimal circulation of the magnetic fluxes without saturation occurring in this second stator component (2), while at the same time reducing the volume of the material used exhibiting high magnetic permeability, and, accordingly, while reducing its weight and the inertia of the mobile device. The second stator part 2 is enclosed in a volume 19 made, for example, of a plastic material incorporating sliding surfaces 20 and 20' at its ends. These sliding surfaces match up with complementary surfaces 21, 22 fastened to the first stator component 1. Ball-bearings or friction bearings 23, 24 delimit the air gap and provide for guidance of the mobile device.

FIG. 3 illustrates a third embodiment of an actuator of this kind, in which the mobile device 25 is positioned and guided by means of spring-leaves 26, 27. In this embodiment, the mobile device 25 is mounted so as to float on the spring-leaves 26, 27. Because of the action exerted by the permanent magnets 10, 11, the mobile device is naturally attracted toward the first stator component. To delimit an air gap, the mobile device 25 should be kept at a short distance from the surface of the stator poles 5 to 7 over the entire functional course of travel. This function can be performed by using a deformable or an elastic connector. In the example described with reference to FIG. 3, this function is performed using spring-leaves 26, 27 composed of thin sheets made of an elastically-deformable material and extending perpendicularly to the plane of the permanent magnets 10, 11. The spring-leaves 26, 27 are attached to each end of the mobile device 25, along connecting strips 28, 29; and along the strips 30, 38 positioned opposite, to extensions 31, 32 of the first stator component 1. The connection parts 31, 32 incorporate portions 34, 35, respectively, which extend perpendicularly to the plane of the magnets 10, 11, and thus parallel to the spring-leaves 26 and 27.

Second pieces 36, 37 extend perpendicularly to the spring-leaves 26, 27 and end in surfaces 30, 38 designed for attachment of the spring-leaves 26, 27. The length of the spring-leaves 26, 27 is determined so that the distance between the surfaces of the magnets 10, 11 facing the surfaces of the stator poles 5, 6, 7 equals the distance necessary to delimit the required air gap.

The length $L_r$ of the spring leaves 26, 27 may, moreover, be calculated in order to be sufficient to ensure that the movements of the mobile device along an axis perpendicular to the plane of the permanent magnets 10, 11 will be negligible with respect to the course of travel of this mobile device 25.

The geometry of the air gap may be modified so as to increase or reduce magnetic stiffness and produce an effect similar to that obtained by changing the stiffness of the suspension springs, so as to attenuate the stresses generated on the spring-leaves, without changing their inherent frequency.

When the spring-leaves are long, the variations in the air gap between the end of the course of travel and the central position are minimized and lead to low magnetic stiffness. The inherent frequency of the mobile device is, in this case, basically determined by the properties of the spring-leaves, and especially by their mechanical stiffness.

On the other hand, when the spring leaves are short, the distance between the surfaces of the magnets 10, 11 and the polar surfaces of the first stator component varies substantially between the central position and the position in which the mobile device has reached the end of its course of travel. This variation of the air gap gives a force phenomenon in the absence of current which tends to draw the mobile device back to a central resting position. The inherent frequency of the mobile device is thus appreciably modified by the magnetic stiffness thus obtained.

In the embodiment shown in FIG. 3, the lateral sides of the first stator component I perpendicular to the axis Y of motion of the mobile device 25 are integrally attached to parts 34, 35 made of a non-magnetic material and having substantially the shape of a parallelepiped. These parts incorporate respective recesses 97, 98, which allow motion of the mobile device 25.

To reduce the space required by the stator component supporting the coil, the central pole 5 is attached to a core 40 whose transverse section is smaller than the transverse section of the core 5. The transverse section of the core is calculated so as to allow circulation of the magnetic flux with minimum saturation. This reduced diameter makes it possible to house a coil having a copper volume greater than that allowed in the case of an actuator in which the section of the core is identical to the section of the central pole 5.

Similarly, the lateral poles 6 and 7 each contain a bevelled surface 41 and 42 making it possible simultaneously to provide an extended lateral polar surface and a mass of material possessing high magnetic permeability sufficient to cause the entirety of the magnetic flux to circulate.

FIG. 4 represents an actuator possessing symmetry generated by rotation.

The first stator component includes four central poles 54, 58, 59, 60, which extend over a surface area slightly smaller than one-quarter of a cylinder. The poles 54, 58, 59 and 60 are separated by a distance e equalling substantially one-half of the air gap E. The coils 61, 62, 63, 64 surround the cores 65, 66, 67, 68, respectively, which extend the stator poles 58, 59, 60, 54 respectively. These cores 65 to 68 extend radially along axes offset in succession in relation to each other by 90°. The sections of these cores are smaller than the dimensions of the central poles, so as to permit the winding of a greater volume of copper.

The lateral poles (not shown in FIG. 4) are tile-shaped and, in transverse cross-section, have shapes substantially identical to those of the central poles 58, 59, 60, 54. Their measured axial length $Y_L$ is greater than the length $Y_C$ of the central pols, so as to allow large coils 62 to 64 to be put in place.

The magnets 10, 11 includes coaxial tubular elements which are radially magnetized in opposite directions.

The actuator described with reference to FIG. 5 is suitable for applications involving the production of linear pneumatic distributing devices.

This actuator includes an outer cylindrical jacket 77 made of a material possessing high magnetic permeability. This outer jacket 77 incorporates, in its median portion, an inner ring-shaped part 102 ending in the central stator pole 54.

The outer cylindrical jacket 77 is impermeably sealed at each end by end plates 75, 76. For this purpose, the cylindrical jacket incorporates at each end a shoulder 90, 91 and an annular bore whose inner diameter matches the outer diameter of the end plates 75, 76. Compressible joints 92, 96 ensure the impermeability of the seal.

The upper lateral cylindrical pole 70 is attached to the upper end plate 75 arranged perpendicularly to the axis of symmetry. The opposite lateral pole 71 is also attached to an end plate 76 which seals the facing part of the cylindrical jacket 77.

The coils 100, 101 are shaped like disks or rings. Their axis of symmetry matches the axis of symmetry of the actuator, and, in particular, of the mobile device. They are mounted in the tubular jacket 77 and are positioned between the ring-shaped part 102 ending in the central pole 54 and the end plates 75 and 76, respectively, fastened to the lateral cylindrical poles 70 and 71, respectively.

The mobile device 50 includes a solid cylindrical part which moves axially in the cylindrical space delimited by the lateral stator poles 70 and 71 and the central stator pole

54. Springs 51, 52 ensure the positioning of the mobile device 50 in a position in which the junction 53 between the two ring-shaped magnets 10 and 11 corresponds to the middle of the central pole 54. The ring-shaped magnets 10, 11 are borne by the second stator component 55 having a ring-shaped part made of a material possessing high magnetic permeability and whose radial section is trapezoidal in shape. A central hub 56 is the final component of the mobile device 50.

In the example described, the mobile device is guided by friction bearings. The reciprocal attraction stresses generated by the stator and rotor counterbalance each other, and no provision has been made to cancel out the degree of rotational freedom around the axis of symmetry.

Calculation of the factor $R_0$ of the coils 100, 101 differs somewhat from the cases previously described. In this case:

$D_b$, the outer diameter of the coils, is a little smaller than the outer diameter of the actuator, and, in particular, than the inner diameter of the jacket 77. It is, therefore, dictated by the maximum allowable space requirement;

$d^b$, the inner diameter of the coils 100, 101, is necessarily a little larger than the average diameter of the magnets 10, 11 $d_a$;

$\lambda$ is the ratio $D_b/d_b$ $\mu$ is the ratio $d_b/d_a$

Thus:

$$F1 = \sqrt{\frac{2\pi\eta}{\rho}} \times B \times D_b \times \sqrt{H} \times \frac{\sqrt{\frac{\lambda-1}{\lambda+1}}}{\lambda \times \mu}$$

In an initial approximation, the factor $\mu$ may be considered to be independent of $\lambda$. For a maximum determinate diameter $D_b$, the optimal value of the term:

$$\frac{\sqrt{\frac{\lambda-1}{\lambda+1}}}{\lambda}$$

must be sought. This optimal value is found mathematically to be $\lambda \cong 1.65$.

For $\lambda=1.4$, or 1.9, only $\cong 2\%$ is lost; for $\lambda=1.3$, or 2.2, only $\cong 7\%$ is lost. Accordingly, the optimal value is not very sharply defined.

For small values of $\lambda$, a small-number of ampere-turns and a large magnet are utilized. Accordingly, a high level of magnet strength under heat can be expected.

For high values of $\lambda$, use is made of a small-diameter magnet possessing a low level of inertia, but a large number of ampere-turns, which may present a risk of demagnetization under heat. In practice, we opt for $1.3 < \lambda < 2$.

With a low error level, the value 0.29, corresponding substantially to the optimal value of $\lambda$, can be taken as the function under consideration. Under these conditions and by replacing the other constants with their normal values, i.e.:

$\rho = 1.72$ E-8 $\Omega$m $\eta = 0.5$ $\mu = 1.2$, for the force per watt-root F1, the following is obtained:

$$F1 \cong 3{,}266 \times B \times D_b \times \sqrt{H}.$$

The length of the recess between the central pole 54 and the lateral poles 70, 71 is at least equal to one-half of the air gap E. In addition, it is possible to produce a discontinuity between the central pole 54 and the lateral poles 70, 71, by providing a zone capable of saturation. This arrangement disrupts the linearity of the force as a function of the current, for current values insufficient for saturating this zone; however, this embodiment remains acceptable in certain cases. It is also possible to consider filling the recess with a material such as non-magnetic stainless steel beneath the magnetic poles, when one wishes to make the volume containing the magnet impermeably separated from the volume containing the coil, e.g., in order to produce a hydraulic system.

As an example, an actuator according to the embodiment described above includes a magnet generating an induction $B_r = 0.65$ T. The thickness of the tubular magnet is 1 mm, and the operating radial clearance is 0.25 mm. The induction generated by this magnet thus corresponds to 0.52 T. For a delivered electric power of 20 watts and a force target of 100 newtons over a course of travel of 4 mm, the following calculation is made:

F1=22.4 Newtons per watt-root, and

H≅0.035 m, when $D_b$=7 E-2 m.

Because the central pole 54 has a length at least equal to the course of travel, increased by a value equal to the total air gap of 1.25 mm, the dimension $Y_C = 5.25$ mm. Under these conditions, the coil height required makes it necessary to produce lateral poles whose dimension $Y_L$ is substantially greater than the pole dimensions $Y_C$ of the central pole. To obtain the same results using an actuator according to prior art, i.e., an actuator having three poles whose length is substantially equal to the stator, the coil thus produced would be characterized by a value of at most H=0.003 m, which would mean a coil having an outer diameter of $D_b$=0.24 m. The magnet diameter $d_a$ would turn out to be 0.12 m, instead of 0.035 m, as in the preceding case. It is thus clear that the solution proposed is appreciably more economical for achieving the force target sought, while retaining the advantages of lack of force in the absence of current, of the constancy of force over the entire course of travel for a given current, and of the proportionality of the force to the current for a given position.

In the application example described, the end plates 75, 76 incorporate holes matching up with the fluid inlets and outlets. These holes connect with a first volume delimited by the cavity in the first stator component and the ring-shaped part extended by the central stator pole with respect to one of the holes; and with the volume delimited by one of the lateral stator poles and by the mobile device, with respect to the other of said holes. These two volumes are connected by means of the spaces 92, 93 separating the central pole 54 from the lateral poles 70 or 71.

The mobile device 50 makes it possible to connect the pressure inlet 80 with the pressure outlet 81, when the mobile device 50 is in the lowered position. When the mobile device 50 is in the raised position, the actuator makes it possible to connect the pressure inlet 82 with the pressure outlet 83. In this application, the gaps 90 to 93 through which the fluid circulates between the inlet orifices and the cavities in which the coils are housed, on the one hand, and the cavity in which the mobile device 50 travels, on the other, are alternatively sealed or unsealed by the outer surface of the mobile device 50.

The invention is described above by virtue of non-limiting examples. It may be produced according to many other variants. In particular, in the axial geometry configuration the magnets may be produced in the shape of tiles possessing a cylindrical section of less than 360 degrees.

Within the cylindrical structures, use may be made of two ring-shaped coils or of four coils, each of which encloses one of the cores or polar enlargements, or indeed of a greater number of coils.

We claim:

1. An electromagnetic actuator generating a force resulting from a substantially constant current applied over an entire functional course of travel and producing a reduced force in an absence of the constant current, comprising:

a stator structure made of a soft magnetic material and including first and second stator components, the first stator component incorporating a central pole having a length $Y_C$ and two lateral poles each having a length $Y_L$, said first and second stator components delimiting an air gap;

a mobile device positioned inside said first and second stator components and comprising two pairs of poles having a length $Y_R$ formed by adjacent thin permanent magnets, transversely magnetized;

wherein said length $Y_C$ of said central pole is greater than or equal to a course of travel Y of the mobile device, increased by a length substantially equal to a length of said air gap, the length $Y_L$ of said lateral poles being determined by a volume filled by an electric trip coil as a function of a force generated by an applied electric power and of a thickness Z of said coil, said thickness Z being measured along an axis perpendicular to a plane of said thin permanent magnets, the length $Y_L$ of said lateral poles being greater than the length $Y_C$ of said central pole, and wherein said thickness Z of said coil is less than, or equal to, its length.

2. The electromagnetic actuator according to claim 1, wherein said stator structure and said mobile device are cylindrical, said mobile device being mobile in translational motion along an axis Y corresponding to an axis of curvature of the cylindrical stator structure and of the rotor, a ratio $D_b/d_b$ being between 1.2 and 2.1, where:

$D_b$ is an outer diameter of the coils; and $d_b$ is an inner diameter of said coils.

3. The electromagnetic actuator according to claim 2, wherein the ratio $D_b/d_b$ is between 1.4 and 1.9.

4. The electromagnetic actuator according to claim 3, wherein the ratio $D_b/d_b$ is substantially equal to 1.65.

5. The electromagnetic actuator according to claim 1, wherein a distance separating the central pole and each of the lateral poles is greater than, or equal to, 0.5 E, where E is a width of the air gap.

6. The electromagnetic actuator according to claim 1, wherein said second stator component is mobile and fastened to the mobile device.

7. The electromagnetic actuator according to claim 6, wherein said second stator component includes a yoke made of a soft magnetic material whose length is at most equal to the length $Y_L$ of said two lateral poles.

8. The electromagnetic actuator according to claim 7, wherein said second stator component has a trapezoidal section, a large base thereof being identical with a surface of junction of the thin permanent magnets.

9. The electromagnetic actuator according to claim 1, wherein said mobile device comprises two thin magnets magnetized in opposite directions, and the second stator component having a trapezoidal section, a connection joining said mobile device and said first stator component being formed by two elastically-deformable spring-leaves extending substantially perpendicularly to the plane of said thin permanent magnets to bias said thin permanent magnets in a center of said air gap.

10. The electromagnetic actuator according to claim 8, wherein said spring-leaves extend perpendicularly to the plane of said thin permanent magnets from an end of a part extending said first stator component perpendicularly to surfaces of said stator poles and to an axis of travel of said mobile device, up to lateral ends of said mobile device.

11. The electromagnetic actuator according to any one of claims 1–10, wherein the electromagnet actuator is utilized in a pneumatic valve, wherein said valve includes a cylindrical body incorporating at least one first outlet connecting with a first inlet when said mobile device occupies a first position, a connection between said first inlet and said first outlet being broken when said mobile device occupies a second position.

* * * * *